Feb. 6, 1945.   C. M. HATHAWAY   2,368,831
OSCILLOGRAPH GALVANOMETER
Filed Sept. 19, 1942   2 Sheets—Sheet 1

Inventor
Claude M. Hathaway
By
Alois W. Graf
Atty.

Feb. 6, 1945.  C. M. HATHAWAY  2,368,831
OSCILLOGRAPH GALVANOMETER
Filed Sept. 19, 1942  2 Sheets-Sheet 2
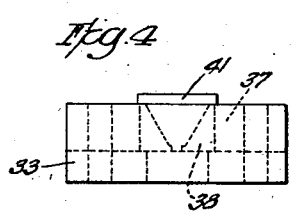
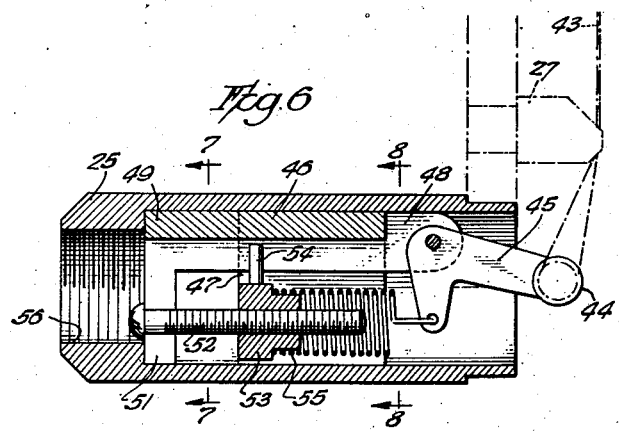
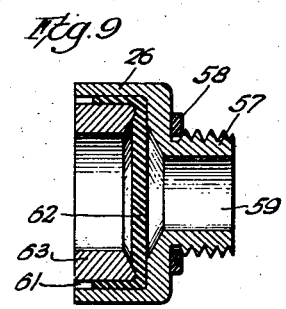
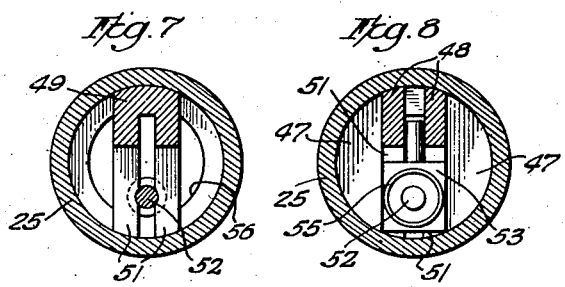
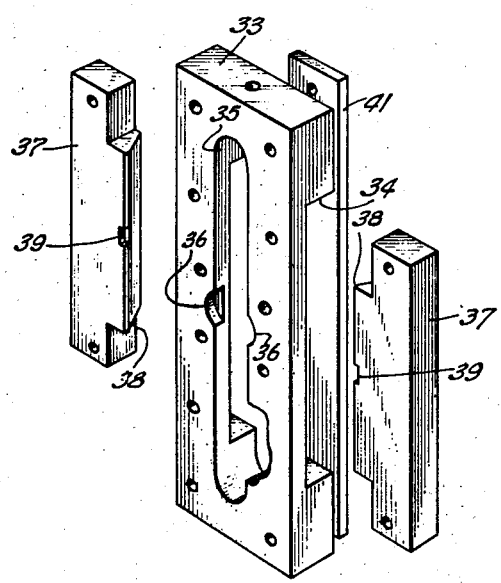
Inventor
Claude M. Hathaway
By Alois W. Graf
Atty.

Patented Feb. 6, 1945

2,368,831

UNITED STATES PATENT OFFICE 2,368,831

OSCILLOGRAPH GALVANOMETER

Claude M. Hathaway, Denver, Colo.

Application September 19, 1942, Serial No. 459,055

15 Claims. (Cl. 171—95)

My invention relates to galvanometers and more particularly to galvanometers for oscillographs.

While numerous types of oscillograph galvanometers have been devised, generally they have been quite complicated and relatively expensive to manufacture. Galvanometers for oscillographs require high precision work and generally the quantities manufactured are relatively small so that it is difficult to gain the advantages of mass-production. Therefore it would be highly desirable to provide an improved galvanometer which is rugged, accurate and yet inexpensive to manufacture. One of the factors which contribute greatly to the expenses of manufacture is the time and care necessary to accurately position the galvanometer element between the pole-tips of the magnet, particularly in the case of bifilar galvanometer elements. Furthermore it would be desirable to provide a means for keeping relatively constant the damping effect of the oil in which the bifilar element is suspended, and also to provide readily accessible means for adjusting the tension of the galvanometer element. These and other desirable features may be obtained in accordance with the present invention whereby a cell box is provided which is relatively simple to construct and which is provided with a piloting device for accurately positioning the galvanometer element with respect to the pole pieces. Means are also provided for permitting the oil to expand with temperature changes so as to maintain more constant the damping action thereof.

It is therefore an object of my invention to provide a new and improved galvanometer structure which will overcome the above mentioned disadvantages heretofore found in the prior art.

Another object of my invention is to provide an improved type of cell box which will be relatively simple to manufacture.

Still another object of my invention is to provide a galvanometer cell box with means whereby the galvanometer element may be quickly and accurately positioned with respect to the pole-tip members.

A still further object of my invention is to provide a galvanometer element tensioning means which is readily accessible upon removal of an oil filler plug.

A still further object of my invention is to provide an arrangement whereby the damping effect of the oil in the cell box will remain more nearly constant over a range of temperatures.

Figure 1:
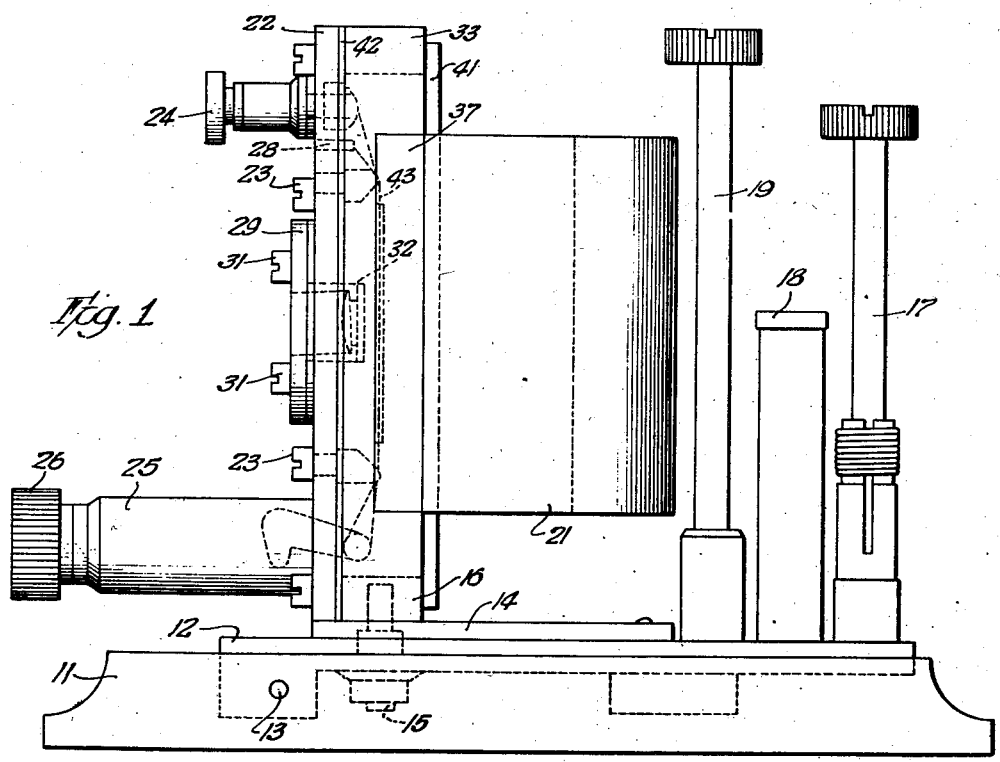
Figure 2:
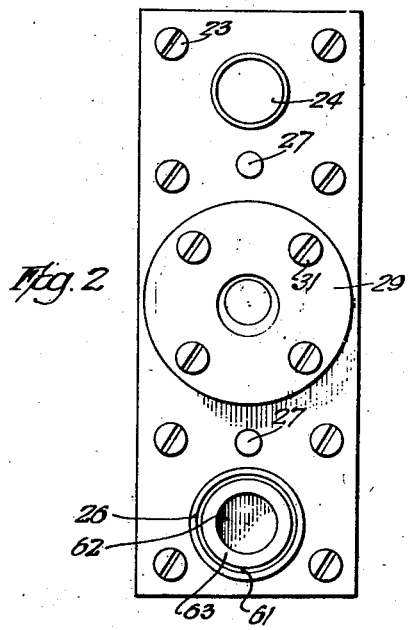
Figure 3:
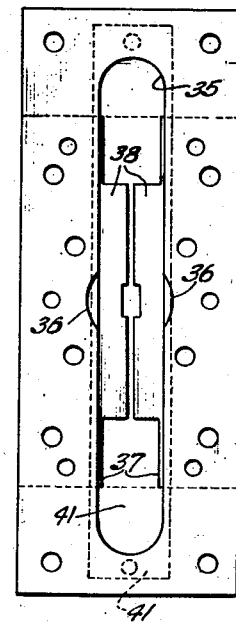

Other and further objects of my invention will be more readily appreciated by reference to the following description taken in connection with the accompanying drawings wherein Figure 1 is an assembled view showing a galvanometer incorporating the features of my invention; Figure 2 is a front view of a galvanometer cell box in assembled relation; Figure 3 is a front view of the galvanometer cell box with the front plate or cover removed therefrom; Figure 4 is a top view of the sides and back of the cell box; Figure 5 is an exploded prospective view of the members forming the sides and back of the galvanometer cell box; Figure 6 is a cross-sectional view of the oil filler chamber wherein there is positioned an adjustable means for regulating the tension on the bifilar galvanometer element; Figure 7 is a cross-section along the line 7—7 of Figure 6; Figure 8 is a cross-section along the line 8—8 of Figure 6; and Figure 9 is a cross-section of the oil filler plug which is adapted to be mounted in the oil filler chamber shown in Figure 6.

Referring to Figure 1, there is shown a side view of an improved galvanometer having a base 11 which supports a base plate 12 upon a pivot 13. Upon the base plate 12, there is positioned another plate 14 which is angularly movable with respect to the plate 12 and the base 11. Since the plate 14 is secured in such relation to the plate 12 by means of suitable fastening means 15 which extend up to the bottom of a galvanometer cell box 16, the horizontally pivoted plate 12 may have the rear end thereof elevated by adjusting an operating mechanism 17 which may be any one of the types well known in the art. The operating mechanism 17 operates against a spring biasing means contained within the cylindrical enclosure 18. The upper plate 14 is angularly movable with respect to the plate 12 of the base 11 by means of the operating mechanism connected to the shaft 19. This operating mechanism also is of a type well known in the art. These adjusting means 17 and 19 are provided so that the light reflected from the mirror supported by the bifilar galvanometer element may be directed at a desired point on a screen or a film in an oscillograph. At the rear of the cell box 16, there is provided a permanent magnet 21 which supplies a magnetic force to the pole pieces forming a portion of the cell box.

By referring to Figure 2 in conjunction with Figure 1, it will be seen that the cell box 16 is provided with a front plate 22 secured in position by suitable fastening means 23. At the upper end of the front plate 22 there is provided a binding post 24 which is connected to one end of a bifilar galvanometer element. Near the bottom of the front plate 22 there is provided an oil filler reservoir 25 having a filler cap 26. The oil reservoir 25 contains adjustable tension means which subsequently will be described and which is shown in Figure 6. The front plate 22 is also provided with a pair of insulated bridge members 27 upon which the bifilar element is strung and supported. The other end of the bifilar element is electrically connected to a suitable stud or post 28 so that a complete electric circuit through the element is obtainable by connection to the binding post 24 and a portion of the chassis of the galvanometer structure. Adjacent the central portion of the front plate there is provided a lens holder 29 secured to the front plate by suitable fastening means 31. The lens holder has an inwardly extending portion 32 which cooperates with a suitable recess formed in the cell box side members.

By referring to Figures 3, 4, and 5, it will be seen that the cell box in addition to the front plate 22 comprises a block of material 33 having at the rear thereof a transverse recess 34 and being provided with an elongated longitudinal recess 35, which adjacent the central portion thereof has a pair of recesses 36 into which the extended portion 32 of the lens holder 29 is arranged to fit. Thus the block of material 33 partially supplies the sides and the back of the cell box 16. Fitted into the transverse recess 34 are a pair of pole pieces, preferably of soft iron, each of which has pole tip portions 38 extending toward the longitudinal center of the block of material 33. Each of the pole tip portions 38 adjacent the center thereof is provided with a recessed portion 39 so as to provide an opening wherein a mirror supported upon the bifilar galvanometer element may rotate in accordance with the electrical energy being supplied to the bifilar element. The opening remaining at the rear of the block of material 33 when the pole pieces 37 are in position is closed by a back plate 41. The pole pieces 37 are preferably secured in position on the block of material 33 by sweating although it will be seen that these pieces are furthermore provided with suitable apertures so that the mounting screws 23 on the front plate 22 may extend through the front plate 22, through the block 33 and into the pole pieces 37. The back plate also may be secured by sweating, soldering or by fastening means such as cap screws.

In the manufacture and assembly of the cell box 16 a block of material such as 33 is first provided with a transverse recess 34 and the longitudinal recess 35. The arcuate recesses 36 are formed at the proper place adjacent the longitudinal recess 35. Thereupon the pole pieces 37 are mounted and secured by sweating, and the back plate is secured in position. The front plate 22 is thereupon provided with the binding post 24, supporting bridges 27, an oil filler reservoir 25 and the mechanism contained thereon, and the lens holder 29 is secured in position. The galvanometer element is then strung upon this assembled plate. Thereafter the front plate is placed upon the block 33 and a gasket 42 is preferably interposed so that by use of the fastening means 23 the cell box 16 may be made fluid tight. By virtue of the fact that the projecting portion 32 of the lens holder 29 extends into the recesses of the block 33, the bifilar galvanometer element is quickly, readily and accurately positioned in the proper relation to the pole tips 38 and the notches 39.

Reference may now be had to Figures 6, 7, and 8 from which the construction and operation of the adjustable means for regulating the tension of the bifilar element will be understood. As has previously been stated, the upper ends of the bifilar element 43 are connected to the binding post 24 and the stud 28 and then are passed over a pair of bridge members 27 to a pulley wheel 44 which is mounted at the end of a bell crank 45. The bell crank 45 is pivotally supported by a member 46 which at the central portion has a substantially cylindrical configuration 47 which conforms to the interior of the oil filler reservoir 25. This cylindrical configuration however is provided with recessed portions so that certain elements of the adjusting mechanism may move therethrough. Extending from one end of the central portion 47 there is a bifurcated portion 48 between which there is supported the bell crank 45. At the other end of the central portion 47 there is provided an extending portion 49 which has a depending portion at the end thereof 51. This depending portion 51 is bifurcated so as to support a screw member 52. The screw member 52 has a threaded portion in engagement with a threaded aperture in the plug 53 which is provided with an up-right pin 54 operating within a narrow guide which is in alignment with the bifurcated portion 48 and with the slot of the bifurcated depending member 51. The pin 54 therefor prevents the plug 53 from turning whenever the screw 52 is being adjusted. Adjacent one end of the plug 53 there is a reduced portion upon which there is supported and secured thereto a spring 55 the other end of which is in engagement with the other arm of the bell crank 45. Thus adjustment of the screw 52 will cause the plug 53 to be moved longitudinally in Figure 6 so as to increase or decrease the tension asserted by the spring 55 upon the bell crank 45 and thereby regulating the tension of the bifilar element 43. It will be noted that the head of the screw 52 is positioned within the threaded opening 56 of the oil filler receptacle 25 so as to be readily accessible whenever the filler plug 29, shown in detail in Figure 9, has been removed.

The oil filler plug shown in Figure 9 which cooperates with the threaded aperture 56 of the oil reservoir 25 comprises a knurled portion 29 having a reduced portion 57 provided with threads for cooperation with the threads in the opening 56. Positioned adjacent the portion 26 of the oil filler plug and adjacent the threads 57 is a suitable gasket 58, so that a proper seal may be obtained. The threaded portion 57 is provided with an opening 59 extending so as to be in communication with a recessed portion 61 formed in the face of the oil filler plug 26. Between the recesses 59 and 61, there is positioned a flexible expansion diaphragm 62 which preferably is formed of an elastic resilient synthetic material which will withstand the action of the oil. This diaphragm 62 is retained in position by a wedging ring 63. By providing communication from the interior of the oil reservoir 25 to the diaphragm of the oil filler plug 26 the damping action of the oil in the cell box will be maintained more nearly constant over a desired range of operating temperatures. A resilient expansion diaphragm 62 which is not affected by the oil permits the oil pressure to be relieved sufficiently so that the damping action of the oil on the mirror suspended on the bifilar element is more nearly constant, thereby greatly increasing the accuracy of the indication given by the galvanometer.

In accordance with my invention therefore, there has been provided a galvanometer cell box which may be manufactured economically and which yet will retain all the characteristics and features generally desired in such structure. The cell box is provided with guide means for receiving the lens holder of the galvanometer cell so that the galvanometer element is accurately positioned within the cell between the tips of the pole pieces. The damping action of the oil is relatively constant over the normal operating temperatures and the tension of the galvanometer element may be readily adjusted by removing the oil filler plug. These features cooperate to permit an economical manufacture of a highly accurate galvanometer for scientific and industrial uses.

While a preferred embodiment of my invention has been shown and described, it of course is to be understood that modifications may be made therein without departing from the spirit and scope of my invention as set forth in the appended claims.

What I claim as new and desire to secure by Letters Patent of the United States is:

1. In an oscillograph galvanometer, a cell box having an elongated block of material provided across the rear surface thereof with a transverse recess for receiving a pair of pole tip members, and being provided with a longitudinal aperture perpendicular to the front and back of said block for receiving a movable galvanometer element and mounting means therefor whereby said movable galvanometer element may be positioned between said pole tip members.

2. In an oscillograph galvanometer, a cell box having a substantially rectangular block of non-magnetic material provided across the rear surface thereof with a transverse recess for receiving a pair of pole tip members, said block being provided between the front thereof and said recess with a longitudinal aperture for receiving a galvanometer element and mounting means therefor whereby said element may be positioned between said pole tip members, said longitudinal aperture being provided with recessed portions for receiving a portion of a lens holder.

3. In an oscillagraph galvanometer, a cell comprising a block of non-magnetic material provided at the rear thereof with a transverse recess and provided between the front and said recess with an elongated aperture having recessed portions, a pair of pole tip members mounted in said rear recess so as to be flush with the back side of said block, a cover plate for closing the aperture remaining between the faces of the spaced pole tip members, a front plate for said box, said front plate being provided with a movable galvanometer element supported therefrom, said element being positioned within said elongated aperture, said front plate being provided with an aperture having a lens holder mounted therein, said lens holder having a portion extending into the recessed portions of the elongated aperture of said block.

4. In an oscillograph galvanometer, a cell comprising a substantially rectangular block of non-magnetic material provided at the rear thereof with a transverse recess and provided between said recess at the front thereof with an elongated aperture having adjacent the center portion thereof recessed portions, a pair of pole tip members mounted in said rear recess so as to be flush with the back side of said block, a rear cover plate for closing the rear of the aperture remaining between said pole tip members, a front plate for said box provided with mounting means supporting thereon a movable galvanometer element, said mounting means and said element being positioned within said elongated aperture, said front plate being provided adjacent the center thereof with an aperture, and a lens holder mounted on said front plate adjacent said recess and extending therethrough into the recessed portions of the elongated aperture of said block.

5. In an oscillograph galvanometer, a cell comprising a block of material provided across the rear surface with a transverse recess and between said recess and the front with an elongated aperture provided with recessed portions, a pair of pole tip members secured in said transverse recess, a front plate for sealing said cell, said front plate supporting a movable galvanometer element and being provided with means engaging said recessed portions of said aperture whereby said movable element is accurately positioned between said elongated pole tips.

6. In an oscillograph galvanometer, a cell comprising a substantially rectangular block of non-magnetic material provided with a transverse recess across the rear surface thereof and between said recess and the front thereof with an elongated aperture, a pair of pole tips secured in said recess by sweating, means for sealing said cell including a front plate provided with mounting means arranged to extend into said elongated aperture to position accurately a movable galvanometer element between said pole tips.

7. In an oscillograph galvanometer cell, an elongated block of material having front and back surfaces of greater area than any other surface and provided across the back surface thereof with a transverse recess and with a longitudinal aperture extending between the front and back, and a pair of pole tip members mounted longitudinally in said recess, said members having relatively narrow pole tip surfaces spaced apart in the proximity of the longitudinal central axis of said block.

8. In an oscillograph galvanometer cell, an elongated block of non-magnetic material having front and back surfaces of greater area than any other surface and provided at the rear with a transverse recess and with a longitudinal aperture extending between the front and rear, and a pair of magnetic pole tip members mounted longitudinally in said recess so as to be flush with the back and sides of said block, said members having relatively narrow pole tip surfaces spaced apart in the proximity of the longitudinal central axis of said block.

9. In an oscillograph galvanometer comprising a closed cell box supporting a pair of pole pieces, a filar galvanometer element positioned between said pole pieces, means for filling said cell box with oil, and means for permitting said oil to expand comprising an oil expansion diaphragm of synthetic elastic material.

10. An oscillograph galvanometer comprising a closed cell box supporting a pair of pole pieces, a filar galvanometer positioned between said pole pieces, means for filling said cell with oil, and means for insuring relatively constant damping action of the oil comprising a diaphragm of synthetic elastic material positioned between the interior and the exterior of said cell box.

11. An oscillograph galvanometer cell comprising a rectangular block having a longitudinal aperture provided with recessed portions, a pair of pole tips supported adjacent said aperture, a front plate for said block having therein an aperture, a filar element supported by said front plate, a lens holder mounted on said plate and having a portion extending therethrough into said recessed portions of said aperture thereby to predetermine the position of said filar element relative to said pole tips, a receptacle mounted on said plate for filling said cell with oil, a removable cover for said receptacle, adjustable means for applying tension to said filar element, said means being mounted within said receptacle so as to be accessible for adjustment when said cover is removed, and means for maintaining relatively constant damping action of the oil in said cell, said means comprising an elastic synthetic diaphragm mounted in said receptacle cover.

12. In an oscillograph galvanometer, a cell box having a block of material provided with an elongated aperture having adjacent the center thereof recessed portions for receiving a portion of a lens holder, a front plate for said box provided with a movable galvanometer element supported thereby, said front plate being provided adjacent the center thereof with an aperture, and a lens holder mounted on said front plate and extending through said aperture, said lens holder having a member complementary to said aperture of said front plate and to the recessed portions of said elongated aperture thereby determining the position of the galvanometer element in said cell box.

13. In an oscillograph galvanometer, a cell box having a block of non-magnetic material supporting a pair of magnetic pole tip members, said block being provided at the front thereof with an elongated aperture having therein recessed portions for receiving a portion of a lens holder, a front plate for said box provided with supporting means having thereon a bifilar element, said front plate being provided with an aperture, and a lens holder mounted on said front plate and having a portion extending therethrough the aperture thereof and into the recessed portions of said block whereby the position of said bifilar element is predetermined with respect to said pole tips.

14. In an oscillograph galvanometer cell comprising a substantially rectangular elongated block of nonmagnetic material, a front cover plate, a lens holder and a rear cover plate, said block of material having adjacent the center a transverse recess and between the front and back thereof a longitudinally elongated aperture, a pair of pole tips mounted in said recess so as to be flush with the outer surfaces of said block, said rear cover plate closing the back of said elongated aperture, said front cover plate being provided with mounting means supporting thereon a movable galvanometer element, said front cover plate being provided with an aperture, said lens holder being mounted on said cover plate so as to extend through the aperture thereof, said lens holder being adapted to fit into a portion of the elongated aperture in said block thereby to properly position the galvanometer element relative to said pole tips.

15. In an oscillograph galvanometer cell comprising a substantially rectangular elongated block of nonmagnetic material, a front cover plate, a lens holder and a rear cover plate, said block of material having at the rear thereof adjacent the center a transverse recess and between the front and back thereof a longitudinally elongated aperture provided at the front adjacent the center thereof with arcuate recessed portions, a pair of pole tips mounted in said rear recess so as to be flush with the back and sides of said block, said rear cover plate closing the back of said elongated aperture, said front cover plate being provided with mounting means supporting therein a movable bifilar galvanometer element, said front cover plate being provided adjacent the center thereof with an aperture, said lens holder being mounted on said cover plate so as to extend through the aperture thereof, said lens holder being adapted to fit into the arcuate recessed portions of the elongated aperture thereby to properly position the galvanometer element relative to said pole tips.

CLAUDE M. HATHAWAY.